(12) United States Patent
Raja et al.

(10) Patent No.: US 10,585,599 B2
(45) Date of Patent: Mar. 10, 2020

(54) SYSTEM AND METHOD FOR DISTRIBUTED PERSISTENT STORE ARCHIVAL AND RETRIEVAL IN A DISTRIBUTED COMPUTING ENVIRONMENT

(71) Applicant: Oracle International Corporation, Redwood Shores, CA (US)

(72) Inventors: Harvey Raja, Manchester (GB); Gene Gleyzer, Lexington, MA (US); Tim Middleton, Perth (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 330 days.

(21) Appl. No.: 15/200,887

(22) Filed: Jul. 1, 2016

(65) Prior Publication Data

US 2017/0003899 A1    Jan. 5, 2017

Related U.S. Application Data

(60) Provisional application No. 62/187,528, filed on Jul. 1, 2015.

(51) Int. Cl.
*G06F 17/30* (2006.01)
*G06F 3/06* (2006.01)
*G06F 11/14* (2006.01)

(52) U.S. Cl.
CPC ............ *G06F 3/0619* (2013.01); *G06F 3/065* (2013.01); *G06F 3/067* (2013.01); *G06F 11/14* (2013.01)

(58) Field of Classification Search
None
See application file for complete search history.

(56) References Cited

U.S. PATENT DOCUMENTS 5,784,569 A   7/1998   Miller
5,819,272 A   10/1998  Benson
5,940,367 A   8/1999   Antonov
(Continued)

FOREIGN PATENT DOCUMENTS

EP   0928089 A2   7/1999

OTHER PUBLICATIONS

Oracle®, Oracle® Database, JDBC Developer's Guide 12c Release 1 (12.1), Jun. 2014, Copyright © 1999, 2014, 520 pages.
(Continued)

*Primary Examiner* — Alex Gofman
(74) *Attorney, Agent, or Firm* — Tucker Ellis LLP (57) ABSTRACT

A system and method for supporting persistent store archival and retrieval in a distributed computing environment. The system provides a central portal operative to initiate the archiving (or retrieval) which is executed in parallel across all members with access to persisted stores, either being sent or gathered from an archive repository. The system and method can include an archive coordinator associated with an in-memory data grid. The archive coordinator receives an instruction to store a snapshot of a current state of the in-memory data grid, the instruction including a storage location, the storage location being a destination selected from the group consisting of a local disk and a shared disk. The system can archive the snapshot of the current state of the in-memory data grid at the storage location.

20 Claims, 4 Drawing Sheets

(56) References Cited

U.S. PATENT DOCUMENTS

| | | | |
|---|---|---|---|
| 5,991,894 A | 11/1999 | Lee | |
| 5,999,712 A | 12/1999 | Moiin | |
| 6,182,139 B1 | 1/2001 | Brendel | |
| 6,377,993 B1 | 4/2002 | Brandt | |
| 6,487,622 B1 | 11/2002 | Coskrey | |
| 6,490,620 B1 | 12/2002 | Ditmer | |
| 6,553,389 B1 | 4/2003 | Golding | |
| 6,615,258 B1 | 9/2003 | Barry | |
| 6,631,402 B1 | 10/2003 | Devine | |
| 6,693,874 B1 | 2/2004 | Shaffer | |
| 6,714,979 B1 | 3/2004 | Brandt | |
| 6,952,758 B2 | 10/2005 | Chron | |
| 6,968,571 B2 | 11/2005 | Devine | |
| 7,114,083 B2 | 9/2006 | Devine | |
| 7,139,925 B2 | 11/2006 | Dinker | |
| 7,260,698 B2 | 8/2007 | Hepkin | |
| 7,266,822 B1 | 9/2007 | Boudnik | |
| 7,328,237 B1 | 2/2008 | Thubert | |
| 7,376,953 B2 | 5/2008 | Togasaki | |
| 7,464,378 B1 | 12/2008 | Limaye | |
| 7,543,046 B1 | 6/2009 | Champagne | |
| 7,698,390 B1 | 4/2010 | Harkness | |
| 7,720,971 B2 | 5/2010 | Moutafov | |
| 7,739,677 B1 | 6/2010 | Kekre | |
| 7,792,977 B1 | 9/2010 | Brower | |
| 7,814,248 B2 | 10/2010 | Fong | |
| 7,882,067 B2 | 2/2011 | Saika | |
| 7,953,861 B2 | 5/2011 | Yardley | |
| 8,195,835 B2 | 6/2012 | Ansari | |
| 8,209,307 B2 | 6/2012 | Erofeev | |
| 8,312,439 B2 | 11/2012 | Kielstra | |
| 8,397,227 B2 | 3/2013 | Fan | |
| 8,402,464 B2 | 3/2013 | Dice | |
| 8,595,714 B1 | 11/2013 | Hamer | |
| 9,609,060 B2 | 3/2017 | Kan | |
| 2002/0035559 A1 | 3/2002 | Crowe | |
| 2002/0073223 A1 | 6/2002 | Darnell | |
| 2002/0078312 A1 | 6/2002 | Wang-Knop | |
| 2003/0023898 A1 | 1/2003 | Jacobs | |
| 2003/0046286 A1 | 3/2003 | Jacobs | |
| 2003/0120715 A1 | 6/2003 | Johnson | |
| 2003/0187927 A1 | 10/2003 | Winchell | |
| 2003/0191795 A1 | 10/2003 | Bernardin | |
| 2004/0059805 A1 | 3/2004 | Dinker | |
| 2004/0153615 A1 | 8/2004 | Koning | |
| 2004/0179471 A1 | 9/2004 | Mekkittikul | |
| 2004/0205148 A1 | 10/2004 | Bae | |
| 2004/0267897 A1 | 12/2004 | Hill | |
| 2005/0021737 A1 | 1/2005 | Ellison | |
| 2005/0083834 A1 | 4/2005 | Dunagan | |
| 2005/0097185 A1 | 5/2005 | Gibson | |
| 2005/0138460 A1 | 6/2005 | McCain | |
| 2005/0193056 A1 | 9/2005 | Schaefer | |
| 2006/0095573 A1 | 5/2006 | Carle | |
| 2007/0016822 A1 | 1/2007 | Rao | |
| 2007/0118693 A1 | 5/2007 | Brannon | |
| 2007/0140110 A1 | 6/2007 | Kaler | |
| 2007/0174160 A1 | 7/2007 | Solberg | |
| 2007/0237072 A1 | 10/2007 | Scholl | |
| 2007/0260714 A1 | 11/2007 | Kalmuk | |
| 2007/0271584 A1 | 11/2007 | Anderson | |
| 2008/0077622 A1 | 3/2008 | Keith | |
| 2008/0276231 A1 | 11/2008 | Huang | |
| 2008/0281959 A1 | 11/2008 | Robertson | |
| 2009/0144714 A1 | 6/2009 | Fan | |
| 2009/0265449 A1 | 10/2009 | Krishnappa | |
| 2009/0320005 A1 | 12/2009 | Toub | |
| 2010/0064341 A1 | 3/2010 | Aldera | |
| 2010/0128732 A1 | 5/2010 | Jiang | |
| 2010/0211931 A1 | 8/2010 | Levanoni | |
| 2010/0312861 A1 | 12/2010 | Kolhi | |
| 2011/0041006 A1 | 2/2011 | Fowler | |
| 2011/0071981 A1 | 3/2011 | Ghosh | |
| 2011/0078211 A1* | 3/2011 | Gass | G06F 8/65 707/803 |
| 2011/0107135 A1 | 5/2011 | Andrews | |
| 2011/0161289 A1 | 6/2011 | Pei | |
| 2011/0179231 A1 | 7/2011 | Roush | |
| 2011/0249552 A1 | 10/2011 | Stokes | |
| 2011/0252192 A1 | 10/2011 | Busch | |
| 2012/0117157 A1 | 5/2012 | Ristock | |
| 2012/0158650 A1 | 6/2012 | Andre | |
| 2012/0158662 A1* | 6/2012 | Buragohain | G06F 11/1461 707/649 |
| 2012/0215740 A1 | 8/2012 | Vaillant | |
| 2012/0254118 A1 | 10/2012 | Shah | |
| 2012/0297056 A1 | 11/2012 | Lee | |
| 2013/0047165 A1 | 2/2013 | Goetz | |
| 2013/0262396 A1* | 10/2013 | Kripalani | G06F 17/30289 707/674 |
| 2015/0058293 A1 | 2/2015 | Kobayashi | |
| 2015/0378849 A1* | 12/2015 | Liu | G06F 16/188 711/162 |
| 2015/0379062 A1* | 12/2015 | Vermeulen | G06F 17/30368 707/691 |

OTHER PUBLICATIONS

European Patent Office, International Searching Authority, International Search Report and Written Opinion dated Jan. 12, 2016 for International Application No. PCT/US2015/052060, 14 pages.

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

* cited by examiner

SYSTEM AND METHOD FOR DISTRIBUTED PERSISTENT STORE ARCHIVAL AND RETRIEVAL IN A DISTRIBUTED COMPUTING ENVIRONMENT

CLAIM OF PRIORITY

This application claims priority to U.S. Provisional Patent Application No. 62/187,528, entitled "SYSTEM AND METHOD FOR DISTRIBUTED PERSISTENT STORE ARCHIVAL AND RETRIEVAL IN A DISTRIBUTED COMPUTING ENVIRONMENT" filed Jul. 1, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and more particularly to a distributed computing environment.

SUMMARY

A snapshot feature allows for saving a copy of a state of a node of a distributed data grid. Snapshots can be used for replicating data from node to node across different distributed data grid clusters, e.g. Oracle Coherence clusters, in a near real-time fashion. Distributed data grid systems can take advantage of the snapshot feature to support federation, and allow for seeding caches that belong to a remote federation service with all the data from the local cluster. Additionally, as described herein, the distributed data grid system can advantageously archive snapshots of all service members in a cluster to a central location to provide an archive of the state of the service across the cluster. Before archiving the snapshots, the system can also, optionally, encrypt and/or compress the snapshots archive. Moreover, in accordance with an embodiment, the system can likewise retrieve a previously archived snapshots archive. Upon retrieval of the snapshots archive, the system can, if the snapshot was encrypted and/or compressed upon archiving, decrypt or un-compress the snapshots archive upon retrieval.

In embodiments, the present disclosure describes a central portal operative to initiate the archiving (or retrieval) which is executed in parallel across all members with access to persisted stores, either being sent or gathered from an archive repository. An archiver implementation will typically manipulate the data to perform common operations such as compression or encryption. A system for supporting persistent store archival and retrieval in a distributed comping environment includes an archive coordinator associated with an in-memory data grid. The archive coordinator can receive instructions to store a snapshots archive of a current state of the in-memory data grid or a service thereof. The instruction includes a central storage location, the central storage location being a destination selected from the group consisting of a local disk and a shared disk. The archive coordinator archives the snapshots of the current state of the nodes of in-memory data grid at the specified storage location and optionally encrypts or compresses the snapshots archive.

These and other objects and advantages of the present invention will become apparent to those skilled in the art from the following description of the various embodiments, when read in light of the accompanying drawings.

DETAILED DESCRIPTION

Figure 1A:
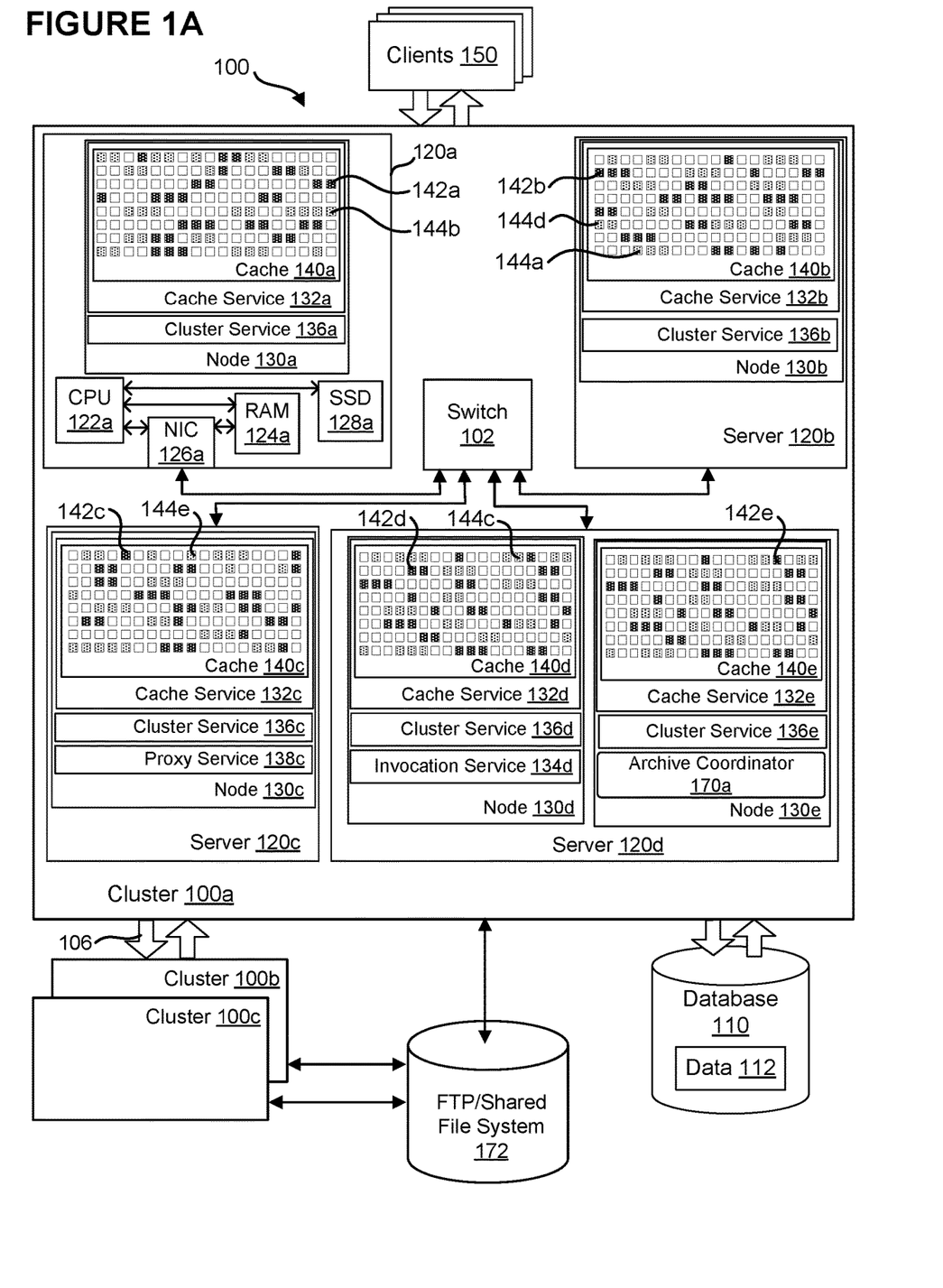
FIG. 1A illustrates a distributed computing environment supporting persistent store archival and retrieval according to an embodiment of the invention.

Described herein are a system and method for supporting persistent store archival and retrieval in a distributed computing environment distributed computing environment, such as a distributed data grid. In embodiments of the present invention, the distributed data grid described with respect to FIG. 1A is provided with persistent store archival and retrieval functionality by incorporating an archive as described with respect to FIGS. 1B, 2 and 3. The persistent store archival and retrieval feature enhances functionality of the distributed data grid by providing a central portal operative to initiate the archiving (or retrieval) which is executed in parallel across all members with access to persisted stores, either being sent or gathered from an archive repository. The persistent store archival and retrieval feature is also useful in a wide variety of other multithreaded messaging systems and multithreaded processing environments.

In the following description, the invention will be illustrated, by way of example and not by way of limitation, in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. Functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A "distributed data grid" or "data grid cluster" is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computationally intensive, stateful, middle-tier applications. In particular examples, distributed data grids, such as e.g., the Oracle® Coherence data grid, store information in-memory to achieve higher performance, and employ redundancy in keeping copies of the information synchronized across multiple servers, thus ensuring resiliency of the system and continued availability of the data in the event of failure of a computer server in the cluster.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described herein, without departing from the scope of the invention.

FIG. 1A shows an example of a distributed data grid 100 which stores data and provides data access to clients 150. Distributed data grid 100 is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster.

Distributed data grid 100 stores information in-memory (for example in the RAM of each data node) to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1A, distributed data grid 100 provides data storage and management capabilities by distributing data over a number of computer servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more.

Server 120a of FIG. 1A, is illustrated as having CPU 122a, Memory 124a and NIC 126a (these elements are also present, but not shown, in each of the other Servers 120b, 120c, 120d and servers, not shown, of additional clusters). Optionally each server may also be provided with flash memory—e.g. SSD 128a—to provide spillover storage capacity. When provided, the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better). The servers and clusters can be networked using for example high performance Ethernet or InfiniBand networks.

A cluster 100a preferably contains a minimum of four physical servers to avoid the possibility of data loss during a failure, but a typical installation has many more than four servers per cluster. Failover and failback are more efficient when more servers are present in each cluster and the impact of a server failure on a cluster is lessened. To minimize communication time between servers, each data grid cluster is ideally confined to a single switch 102 which provides single hop communication between all of the servers. A cluster may thus be limited by the number of ports on the switch 102. A typical cluster will therefore include between 4 and 96 physical servers networked using a single switch.

In most Wide Area Network (WAN) implementations of a distributed data grid 100, each data center in the WAN has independent, but interconnected, data grid clusters (e.g., 100a, 100b, and 100c). A WAN may, for example, include many more clusters than shown in FIG. 1A. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid, the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the services provided on nodes of the distributed data gird include, for example, the cluster service, the proxy service, the invocation service, and distributed cache service. The cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. instances of the distributed cache service operating on each of the nodes manage distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1A, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications read and write data to and from the data grid, avoiding expensive requests to back-end data sources such as databases. The shared data cache provides a single, consistent view of cached data. Reading from the cache is faster than querying back-end data sources and scales naturally with the application tier. In-memory data storage alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

Figure 1B:
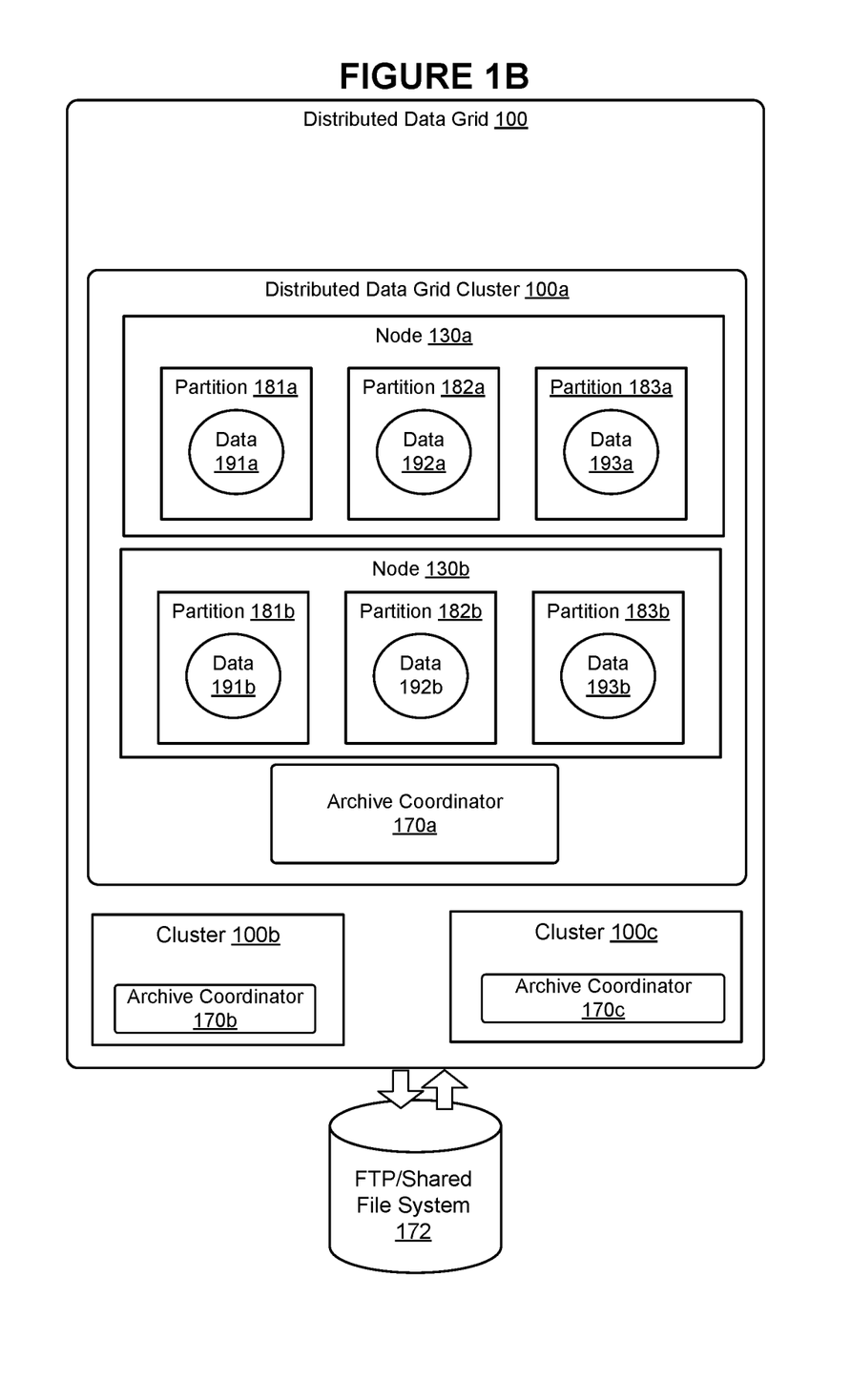
FIG. 1B illustrates a distributed computing environment supporting persistent store archival and retrieval according to an embodiment of the invention.

In embodiments, a distributed data gird such as shown in FIG. 1A supports a snapshot feature for replicating data of nodes of the distributed data grid and an archive coordinator for managing persistent archiving and retrieval. FIG. 1B shows an illustration of supporting an archive coordinator 170a which manages storing and/or retrieving persistent snapshots archives on an external resource, e.g. shared file system 172 comprising a persistent storage medium such as a disk array, flash array, tape, or other form of high capacity computer-readable storage medium in a distributed computing environment. As shown in FIG. 1B, the distributed data grid 100 can include a (local) cluster 100a which includes a plurality of cluster members, e.g. nodes 130a and 130b in the cluster 100a. The archive coordinator 170a can provide a central portal is operative to initiate the archiving (or retrieval) which is executed in parallel across all members with access to persisted stores, either being sent or gathered from an archive repository. Archive coordinators can be provided for each cluster in the distributed computing environment (see archive coordinator 170 of Cluster 100b and archive coordinator 100c of Cluster 100c).

For each of the partitions in the cluster 100a (i.e. the partitions 181a, 182a, 183a, 181b, 182b, 183b), a synchronization request can be added to a snapshot internal cache. Additionally, the snapshot internal cache can have a backup for safely completing pending replication requests in the case of node/machine failures. The system can replicate the entire data set in the local cluster 100a without quiescing the service on the source cluster 100a or locking the data set 191*a*, 192*a*, 193*a*, 191*b*, 192*b*, 193*b* for replication by replicating a snapshot of each node. Furthermore, the snapshot operation is a light-weight operation with minimal resource impacts, since the system can replicate the data directly from each of the caches in the local cluster 100*a* to a corresponding node in a remote cluster without a need for making a copy to any internal federation cache. Thus, the snapshot feature allows a user to make a copy of data stored in each node of a cluster of a distributed data grid at a particular point in time, while the cluster is operational, with minimal impact to clients. For example, the snapshot operation can be triggered via a JMX (Java Management Extensions) operation on a Snapshot Management Bean in an Oracle® Coherence data grid. The snapshot operation can also be triggered from an application.

Details regarding implementation of snapshots is a distributed data grid are disclosed in U.S. patent application Ser. No. 14/866,585 titled "SYSTEM AND METHOD FOR SUPPORTING DATA GRID SNAPSHOT AND FEDERATION" filed Sep. 25, 2015, and U.S. patent application Ser. No. 14/271,161 titled "SYSTEM AND METHOD FOR PROVIDING A PERSISTENT SNAPSHOT OF A RUNNING SYSTEM IN A DISTRIBUTED DATA GRID" filed May 6, 2014, both of which applications are incorporated herein by reference.

While the snapshot feature permits replication of data to provide a persistent replica of the data on each node, it may be necessary or desirable to create a copy of the data of all the nodes of the data grid as it exists at a particular point in time (collection of snapshots of all service members) and archive this data to an external resource shared among the clusters (snapshot archive). Such archives on the external resource may be useful for backup in case of catastrophic failure and/or forensic purposes where analysis of changes in data over time are required. In an embodiment of the present invention a distributed data gird cluster is provided with an archive coordinator 170*a* which manages storing and/or retrieving persistent snapshots archives on an external resource, e.g. shared file system 172 comprising a persistent storage medium such as a disk array, flash array, tape, or other form of high capacity computer-readable storage medium as described below.

Persistent Store Archival and Retrieval

As described above, it may be necessary or desirable to create a copy of the state of each node of a data grid as it exists at a particular point in time (plurality of snapshots) and archive this data to an external resource (snapshots archive) shared among the clusters. Each snapshot is a consistent copy of the contents of cache and metadata for a particular service. A snapshot may be distributed across many members and/or on a shared disk as described above. A Snapshots Archive is a complete copy of snapshots for a particular service (such as e.g. the distributed cache service) archived to a centralized location from all members and stored in an independent format. Snapshots for each service member are created on local disk and the subsequently archived from the local or shared disk to the archive repository in parallel under control of the archive coordinator which provides a central portal for initiating the archiving (or retrieval. An archived snapshot can be "retrieved" from a central location/archived repository to all members for future recovery of a complete cluster service. Persistent store archival provides a mechanism for recoverable caching which enables the in-memory data grid to serve as the store of record. With the in-memory data serving as the store of record, the persistent store provides for recoverable storage of replicas of the data (snapshots). This provides for automatic recovery from cluster failure, and transactional or on-demand durability.

In an Oracle® Coherence distributed data grid, snapshots can be used to backup and restore caches. The persistence statements rely on the persistence settings that are configured for a service. A CREATE SNAPSHOT statement persists the data partitions of a service to disk. A VALIDATE SNAPSHOT statement is used to check whether a snapshot is complete and without error. The RECOVER SNAPSHOT statement restores the data partitions of a service from disk. If the service has not been explicitly suspended, then: the service is suspended; the snapshot recovered; and the service is resumed. Any existing data in the caches of a service are lost. A service argument is used to specify the name of the partitioned or federated cache service for which the snapshot is\was created.

The ARCHIVE SNAPSHOT statement saves a snapshot to a central location. The location is specified in the snapshot archiver definition that is associated with a service. The RETRIEVE ARCHIVED SNAPSHOT statement is used to retrieve an archived snapshot so that it can be recovered using the RECOVER SNAPSHOT statement. The REMOVE SNAPSHOT statement is used to delete a snapshot or an archived snapshot from disk. The SUSPEND SERVICE and RESUME SERVICE commands are used to ensure persistence operations are performed on a non-active service. For some persistence operations, the service is automatically suspended and resumed when the statement is executed.

However, managing the persisted state on many machines across multiple clusters is cumbersome and allowing customers to perform tasks across this persisted state is complicated. Persisting the storage of a plurality of snapshots of nodes of an in-memory data grid on a shared disk provides advantages over storing it on a local disk. For example, the shared disk can be more manageable as managing the persisted state of many machines (nodes) across a cluster can be cumbersome. Additionally, having the persisted state of each of the many machines (nodes) on a shared disk at a central location can allow for access in order to perform tasks across the persisted state of all of the many machines. Moreover, archiving the persisted state of all the nodes of a distributed data grid (snapshots archive) to an external shared resource has the advantage of reclaiming disk space on each cluster for local snapshots of each node.

In an embodiment of the present invention a distributed data gird cluster is provided with an archive coordinator 170*a* which manages storing and/or retrieving persistent snapshots archives on an external resource, e.g. shared file system 172 comprising a persistent storage medium such as a disk array, flash array, tape, or other form of high capacity computer-readable storage medium. The archive coordinator 170*a* provides a central portal operative to initiate the archiving (or retrieval) which is executed in parallel across all members with access to persisted stores, either being sent or gathered from an archive repository. The external resource can be for example, a shared file system or an FTP server. Multiple storage topologies are supported. Maximum scalability is achieved using distributed local disks whereas maximum availability is achieved using shared storage such as a SAN. A combination or local disk storage of snapshots and shared storage for a snapshots archive provides the advantages both of scalability and availability.

Figure 2:
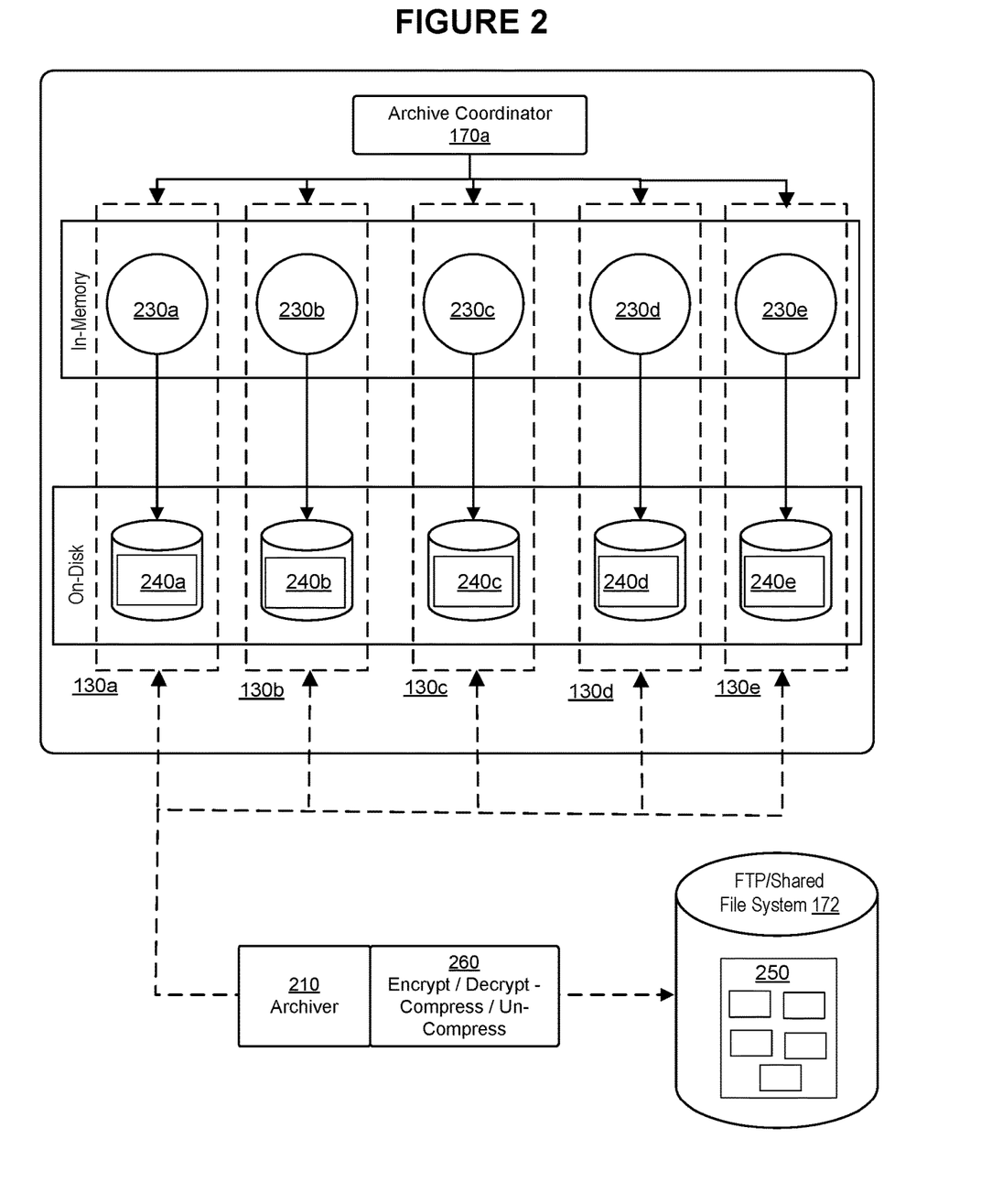
FIG. 2 illustrates a system supporting persistent store archival and retrieval in a distributed computing environment, according to an embodiment of the invention.

FIG. 2 shows an illustration of supporting persistent store archival and retrieval in a distributed computing environment, in accordance with an embodiment. In accordance with an embodiment, persistence functionality is provides the ability to snapshot the state of a complete running distributed system such as a cluster to a disk. The collective state of the nodes which are members of a service can be persisted to a common location such as the FTP/Shared File System in FIG. 2. From the common location, the snapshots of the nodes of in-memory data grids can then be recovered when required. Persisting snapshots to an external resource such as a shared file system or FTP server reclaims local disk space for additional snapshots. Additionally, persisting the snapshots archive to a common location facilitates operations on the snapshots archive in the common location instead of requiring operations to be performed on snapshots distributed across local disks in the cluster.

As shown in FIG. 2, the distributed computing environment includes the archive coordinator 170a, archiver 210, an in-memory data grid, local on-disk snapshot storage locations, and a FTP/Shared File System 172. The system also includes an in-line module 260 that can encrypt and/or compress a snapshot on storage, and decrypt and/or un-compress a snapshot on retrieval.

As shown in FIG. 2, each of nodes 130a, 130b, 130c, 130d, and 130e has an in-memory state 230a, 230b, 230c, 230d, and 230e. Under control of archive coordinator 170a, each node can be commanded to create a snapshot of its in-memory state to a local disk. Thus each of nodes 130a, 130b, 130c, 130d, and 130e can store a snapshot 240a, 240b, 240c, 240d, and 240e on a local disk. Subsequently, under control of archive coordinator 270, each of the snapshots 240a, 240b, 240c, 240d, and 240e on can be archived by archiver 210 to a snapshots archive 250 at a central location e.g. FTP/Shared File System 172. In-line module 260, under control of archive coordinator 170a, can encrypt and/or compress a snapshots archive on storage, and decrypt and/or un-compress a snapshots archive on retrieval. In accordance with an embodiment, the archive coordinator 170a can begin a snapshot process and snapshots archiving process.

Where nodes are persisted to local disk, each machine has own local disk. Recovery hosts must include all hosts to ensure all persisted partitions are "discovered". However, this only provides node-safety (not cluster safety). In comparison, where all the nodes are to be persisted to a central location such as FTP/Shared File System 172, all of the machines in the distributed data grid are able to see all partitions via the shared storage. This allows other members/nodes/machines to recover persisted partition from shared storage (for example if a member has failed). Recovery hosts (machines present before recovery can start) need not be members, as long as there are enough to hosts to load data (they become members when a snapshot of the service is restored on them). This provides a different level of data reliability compared to snapshots stored on disks that are local to the machine. Such locally stored snapshots may become unavailable when the machine itself becomes unavailable. Thus, archiving snapshots to an archive repository under control of the archive coordinator provides enhanced data security and durability as compared to prior snapshot implementations.

The snapshot process and snapshots archiving process can be triggered at the at the archive coordinator by an administrator or other authorized user, rules, or from an application that requests a snapshots archive. When the snapshot is stored on a shared disk, the snapshot can optionally be encrypted and/or compressed before storage on the shared disk. Upon retrieval of encrypted and/or compressed snapshot from the shared disk, the snapshot can be decrypted and/or un-compressed, depending upon what, if any, processes were applied to the snapshot upon storage. In embodiments, the archive coordinator provides functions for archiving snapshots to the central location, retrieving snapshots from the central location, purging stored snapshots, providing information about archived snapshots and providing information about stores of archived snapshots.

Recoverable Caching

As described above, persistent store archival and snapshot storage provide mechanism for recoverable caching which enables the in-memory data grid to serve as the store of record. With the in-memory data serving as the store of record, the persistent store provides for recoverable storage of replicas of the data (snapshots). This provides for automatic recovery from cluster failure, and transactional or on-demand durability.

Recoverable caching Recoverable caching provides the ability to persist all cache mutations to disk and to be able to recover this state either as required or on restart of a cluster—including meta-data like Triggers, indexes, Locks and Listeners. Two persistence modes are available. In an active presentence mode, all data is persisted to disk in the same atomic operation as a backup to another member. Clients only receive a response when both operations are complete. In an On-Demand persistence mode—data is not persisted in real-time, but a snapshot of the current data is created on disk or recovered from disk as required. Persisted data can be located on a shared disk or local disks to each of the servers.

Before creating or recovering a snapshot, a service is suspended which ensures cache mutations are suspended and no membership changes occur during the operation. A "snapshot" of the caches for a service can be initiated after service is suspended (quiesced) when in either active or on-demand mode. Snapshots be archived to and retrieved from to a central location. Each storage-enabled member is responsible for persistence operations for the partitions it owns. Snapshots are at a service level and include all "non-transient" caches associated with the service.

Recovery operations enabled using recoverable caching allow for retrieving the persisted data from disk, (either automatically on cluster start-up or from a named snapshot} and "populating" the given caches with data from the persistence store. Recoverable caching operations can be performed through JMX via a Snapshot Manager MBean, using tools like JVisualVM, JConsole and JMC. JMX is a JAVA standard for managing and monitoring JAVA applications and services and is be used as a management service in the Oracle® Coherence Distributed data grid. For example, recoverable caching operations can be triggered via a JMX (Java Management Extensions) operation on a Snapshot Management Bean in an Oracle® Coherence data grid. In an embodiment, a management console GUI is provided for controlling recoverable caching capabilities for easily executing operations.

In an embodiment, the system and method for distributed persistent store archival and retrieval provides an interface to control archive configuration as part of a persistence environment. First a persistence environment is defined. The persistence environment defines the persistence mode, either active or passive and the active location for snapshot storage for each node. The persistence environment further defines a shared directory location and a directory archiver to archive snapshots from the local disk to the shared directory location. The persistence environment further defines address providers which specifies which host nodes must be present before a recovery of partitions is started.

Figure 3:
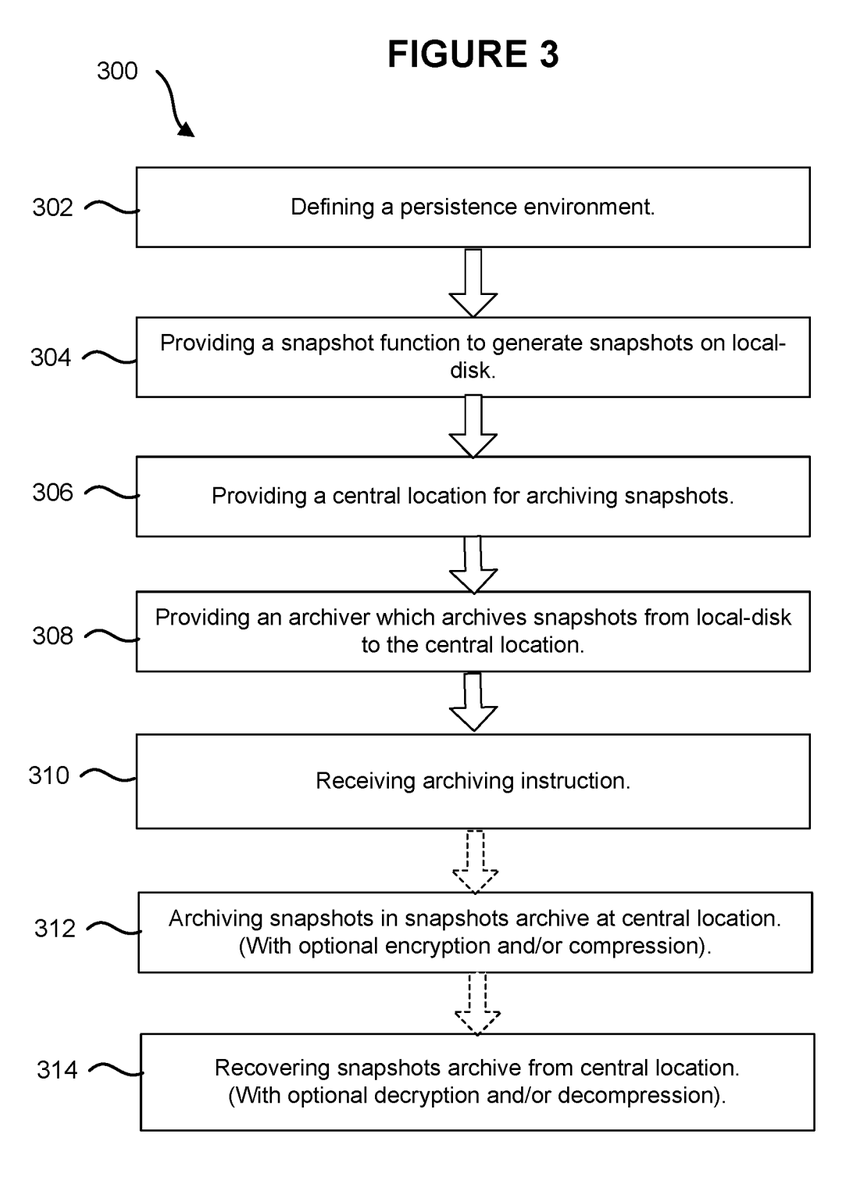
FIG. 3 illustrates a method supporting persistent store archival and retrieval in a distributed computing environment, according to an embodiment of the invention.

FIG. 3 illustrates a method 300 supporting persistent store archival and retrieval in a distributed computing environment, according to an embodiment of the invention. A shown in FIG. 3, a persistence environment is defined at step 302. At step 304 a snapshot function is provided for generating snapshots of node state on local disk. At step 306 a central location accessible from all machines is provided for archiving snapshots (as specified in the persistence environment). At step 308 an archiver is provided which archives snapshots (under control of the archive coordinator) from the local disk to the central location. At step 310, the archiver receives instructions from the archive coordinator to archive snapshots to the central location. At step 312 the archiver archives snapshots from the local disks to the central location. Optionally the archived snapshots are compressed or unencrypted. If and when desired, at step 314, the archived snapshots may be retrieved and recovered from the central location to the recovery hosts. Decryption and/or decompression may be performed if the archive was encrypted and/or compressed.

Thus, the use of persistent storage of snapshots at the local disc and central location provides the advantages both of scalability and availability for persistence. Moreover, the system provides node safety and cluster level safety (using the centralized location. This provides for provides for recoverable storage of replicas of the data (snapshots). This provides for automatic recovery from cluster failure, and transactional or on-demand durability. By ensuring on-demand durability and recovery from cluster failure, the in-memory data can reliable serve as the store of record for transactional data.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting persistent store archival and retrieval in a distributed computing environment comprising a cluster including a plurality of computer systems connected by a network through a switch, each computer system having a RAM, a processor, and a local non-volatile storage, and a plurality of storage members operating on said plurality of computer systems, the method comprising:

using each storage member of the plurality of storage members to store an associated partition of a dataset in the RAM of the computer system on which said each of the plurality of storage members operates, providing a single archive coordinator operating on one of said plurality of computer systems of the cluster;

providing an archiver;

using the single archive coordinator to instruct all of the plurality of storage members to persist a snapshot of the associated partition of the dataset onto the local non-volatile storage of the computer system on which each of the plurality of storage members operates;

operating all of the plurality of storage members to persist a snapshot of the associated partition of the dataset from the RAM onto the local non-volatile storage of the computer system on which each of the plurality of storage members operates;

using the archive coordinator to instruct the archiver to archive all of the snapshots persisted by the plurality of storage members;

using the archiver to retrieve all of the snapshots persisted by each of the plurality of storage members from the local non-volatile storage of the computer system on which said each of the plurality of storage members operates; and using the archiver to create a snapshot archive of all of the snapshots persisted by the plurality of storage members and store the snapshot archive in an archive repository, whereby the snapshot archive stored in the archive repository includes all of the snapshots of all of the partitions of the dataset in said RAM of said plurality of computer systems in the distributed computing environment.

2. The method of claim 1, further comprising:
encrypting the snapshot archive before storing the snapshot archive in the archive repository.

3. The method of claim 1, further comprising:
compressing the snapshot archive before storing the snapshot archive in the archive repository.

4. The method of claim 1, further comprising:
retrieving the snapshot archive from the archive repository upon receiving an instruction to retrieve the snapshot archive.

5. The method of claim 1, wherein:
said storage repository comprises a storage area network (SAN).

6. The method of claim 1, further comprising:
retrieving the snapshot archive during automated recovery of said cluster.

7. The method of claim 1, wherein operating all of the plurality of storage members to persist a snapshot of the associated partition of the dataset from the RAM onto the local non-volatile storage of the computer system on which said each of the plurality of storage members operates comprises:

operating all of the plurality of storage members to persist a snapshot of the associated partition of the dataset from the RAM onto a local SSD of the computer system on which said each of the plurality of storage members operates.

8. The method of claim 1, wherein storing the snapshot archive in an archive repository includes transmitting the snapshot archive to the storage location using File Transfer Protocol (FTP).

9. The method of claim 1, further comprising: deleting said each of the snapshots persisted by each of the plurality of storage members from the local non-volatile storage of the computer system on which said each of the plurality of storage members operates after using the archiver to retrieve each of the snapshots persisted by each of the plurality of storage members from the local non-volatile storage of the computer system on which said each of the plurality of storage members operates thereby reclaiming space in said local non-volatile storage.

10. The method of claim 1, further comprising:
providing a snapshot service on each of the plurality of storage members;
wherein the snapshot services on each of the plurality or storage members perform in parallel said persisting the snapshot of the associated partition of the dataset onto the local non-volatile storage of the computer system on which said each of the plurality of storage members operates under control of said archive coordinator.

11. A distributed computing environment comprising:
a cluster including a plurality of computer systems connected by a network through a switch, each computer system having a RAM, a processor, and a local non-volatile storage;
a plurality of storage members operating on said plurality of computer systems;
wherein the distributed computing environment is configured to perform steps comprising:
using each storage member of the plurality of storage members to store an associated partition of a dataset in the RAM of the computer system on which said each of the plurality of storage members operates;
providing a single archive coordinator operating on one of said plurality of computer systems of the cluster;
providing an archiver;
using the archive coordinator to instruct all of the plurality of storage members to persist a snapshot of the associated partition of the dataset onto the local non-volatile storage of the computer system on which said each of the plurality of storage members operates;
operating all of the plurality of storage members to persist a snapshot of the associated partition of the dataset from the RAM onto the local non-volatile storage of the computer system on which each of the plurality of storage members operates;
using the archive coordinator to instruct the archiver to archive all of the snapshots persisted by the plurality of storage members;
using the archiver to retrieve all of the snapshots persisted by each of the plurality of storage members from the local non-volatile storage of the computer system on which said each of the plurality of storage members operates; and
using the archiver to create a snapshot archive of all of the snapshots persisted by the plurality of storage members and store the snapshot archive in an archive repository, whereby the snapshot archive stored in the archive repository includes all of the snapshots of all of the partitions of the dataset from said RAM of said plurality of computer systems in the distributed computing environment.

12. The distributed computing environment of claim 11, wherein said steps further comprise:
encrypting the snapshot archive before storing the snapshot archive in the archive repository.

13. The distributed computing environment of claim 11, wherein said steps further comprise:
compressing the snapshot archive before storing the snapshot archive in the archive repository.

14. The distributed computing environment of claim 11, wherein said steps further comprise:
retrieving the snapshot archive from the archive repository upon receiving an instruction to retrieve the snapshot archive.

15. The distributed computing environment of claim 11, wherein said storage repository comprises a storage area network (SAN).

16. The distributed computing environment of claim 11, wherein said steps further comprise:
retrieving the snapshot archive during automated recovery of said cluster.

17. The distributed computing environment of claim 11, wherein operating all of the plurality of storage members to persist a snapshot of the associated partition of the dataset from the RAM onto the local non-volatile storage of the computer system on which said each of the plurality of storage members operates comprises:
operating all of the plurality of storage members to persist a snapshot of the associated partition of the dataset from the RAM onto a local SSD of the computer system on which each of the plurality of storage members operates.

18. The distributed computing environment of claim 11, wherein said steps further comprise:
deleting said each of the snapshots persisted by each of the plurality of storage members from the local non-volatile storage of the computer system on which said each of the plurality of storage members operates after using the archiver to retrieve each of the snapshots persisted by each of the plurality of storage members from the local non-volatile storage of the computer system on which said each of the plurality of storage members operates thereby reclaiming space in said local non-volatile storage.

19. The distributed computing environment of claim 11, wherein said steps further comprise:
providing a snapshot service on each of the plurality of storage members;
wherein the snapshot services on each of the plurality or storage members perform in parallel said persisting the snapshot of the associated partition of the dataset onto the local non-volatile storage of the computer system on which said each of the plurality of storage members operates under control of said archive coordinator.

20. A non-transitory computer-readable medium having instructions stored thereon for supporting persistent store archival and retrieval in a distributed computing environment comprising a cluster including a plurality of computer systems connected by a network through a switch, each computer system having a RAM, a processor, and a local non-volatile storage, and a plurality of storage members operating on said plurality of computer systems, which instructions, when executed, cause the distributed computing environment to perform steps comprising:
using each storage member of the plurality of storage members to store an associated partition of a dataset in the RAM of the computer system on which said each of the plurality of storage members operates, providing a single archive coordinator operating on one of said plurality of computer systems of the cluster;

providing an archiver;

using the single archive coordinator to instruct all of the plurality of storage members to persist a snapshot of the associated partition of the dataset onto the local non-volatile storage of the computer system on which each of the plurality of storage members operates;

operating all of the plurality of storage members to persist a snapshot of the associated partition of the dataset from the RAM onto the local non-volatile storage of the computer system on which each of the plurality of storage members operates;

using the archive coordinator to instruct the archiver to archive all of the snapshots persisted by the plurality of storage members;

using the archiver to retrieve all of the snapshots persisted by each of the plurality of storage members from the local non-volatile storage of the computer system on which said each of the plurality of storage members operates; and using the archiver to create a snapshot archive of all of the snapshots persisted by the plurality of storage members and store the snapshot archive in an archive repository, whereby the snapshot archive stored in the archive repository includes all of the snapshots of all of the partitions of the dataset in said RAM of said plurality of computer systems in the distributed computing environment.

* * * * *

UNITED STATES PATENT AND TRADEMARK OFFICE
CERTIFICATE OF CORRECTION

PATENT NO. : 10,585,599 B2
APPLICATION NO. : 15/200887
DATED : March 10, 2020
INVENTOR(S) : Raja et al.

It is certified that error appears in the above-identified patent and that said Letters Patent is hereby corrected as shown below:

On the Title Page

On page 2, Column 2, item (56) under Other Publications, Line 8, delete "Hetergeneous" and insert -- Heterogeneous --, therefor.

In the Claims

In Column 15, Line 19, in Claim 10, delete "or" and insert -- of --, therefor.

In Column 16, Line 48, in Claim 19, delete "or" and insert -- of --, therefor.

Signed and Sealed this
Tenth Day of November, 2020

Andrei Iancu
*Director of the United States Patent and Trademark Office*